US007944578B2

(12) United States Patent
Yoda

(10) Patent No.: US 7,944,578 B2
(45) Date of Patent: May 17, 2011

(54) ALBUM PROVISION SYSTEM AND METHOD

(75) Inventor: Akira Yoda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1435 days.

(21) Appl. No.: 11/400,332

(22) Filed: Apr. 10, 2006

(65) Prior Publication Data

US 2006/0235718 A1 Oct. 19, 2006

(30) Foreign Application Priority Data

Apr. 19, 2005 (JP) ................................ 2005-121125

(51) Int. Cl.
*B42D 15/00* (2006.01)
*G06K 15/00* (2006.01)

(52) U.S. Cl. ........... 358/1.18; 283/72; 283/700; 705/51; 705/52

(58) Field of Classification Search ................. 358/1.12, 358/1.15, 1.18; 705/51, 52; 235/488; 283/72, 283/100
See application file for complete search history.

(56) References Cited

U.S. PATENT DOCUMENTS 5,560,657 A * 10/1996 Morgan .......................... 283/80
5,851,615 A * 12/1998 Kay ............................. 428/40.1
6,155,602 A * 12/2000 Mylander et al. ............... 281/42
6,308,988 B1 * 10/2001 Mylander et al. ............... 281/42
6,324,545 B1 * 11/2001 Morag .......................... 707/737
6,447,015 B1 * 9/2002 Linnewiel ....................... 283/81
2002/0142121 A1 * 10/2002 Hingsen-Gehrmann et al. ............................ 428/40.1
2003/0004889 A1 * 1/2003 Fiala et al. ...................... 705/64
2004/0209028 A1 * 10/2004 Gosselin ...................... 428/40.1
2005/0258634 A1 * 11/2005 Dronzek, Jr. .................... 283/72
2006/0018569 A1 * 1/2006 Bonenfant ........................ 383/5

FOREIGN PATENT DOCUMENTS

JP 2004-221647 A 8/2004

* cited by examiner

*Primary Examiner* — Twyler L Haskins
*Assistant Examiner* — Kent Yip
(74) *Attorney, Agent, or Firm* — Sughrue Mion, PLLC

(57) ABSTRACT

An album provision system is provided to prevent an album from being copied before it has not been charged for creating the album when the album is provided to a user. The album provision system includes: an image acquiring section for acquiring an image; an album creating section for creating an album by the acquired image; a film applying section for applying a viewing protection film to prevent the image from being viewed on the image laid out in the album; a film presence determining section for determining whether the viewing protection film is still applied on the image laid out in the album returned from the user when the album on which the viewing protection film is applied is provided to the user and then the album is returned from the user; and a charging section for charging the user when the film presence determining section determines that the viewing protection film is not applied on the image.

8 Claims, 8 Drawing Sheets

60

| IMAGE IDENTIFIER | IMAGE DATA | IMAGE LAYOUT | IMAGE SIZE |
|---|---|---|---|
| #602 | □ | ○○○○○ | ○△ |
| #604 | □ | △△△△△ | △□ |
| #606 | □ | ▽▽▽▽▽ | ×○ |
| ⋮ | ⋮ | ⋮ | ⋮ |

FIG. 4

40

| FILM IDENTIFIER | FILM DATA |
|---|---|
| #402 | △△△△ |
| #404 | □□□□ |
| #406 | ●●●● |
| ⋮ | ⋮ |

FIG. 5

50

| IMAGE IDENTIFIER | FILM IDENTIFIER | FILM APPLYING POSITION |
|---|---|---|
| #602 | #402 | ○○○○ |
| #604 | #402 | ○○△△ |
| #606 | #410 | ××○○ |
| ⋮ | ⋮ | ⋮ |

*FIG. 6*

710

| FILM IDENTIFIER | FILM DATA | IMAGE DIFFERENCE FUNCTION |
|---|---|---|
| #402 | △△△△ | ○○□□ |
| #404 | □□□□ | □○○□ |
| #406 | ●●●● | △○○△ |
| ⋮ | ⋮ | ⋮ |

FIG. 7

ALBUM PROVISION SYSTEM AND METHOD

CROSS REFERENCE TO RELATED APPLICATION

The present claims priority from Japanese Patent Application No. JP 2005-121125 filed on Apr. 19, 2005, the contents of which are incorporated herein by reference.

BACKGROUND OF THE INVENTION

1. Field of the Invention

The present invention relates to an album provision system and an album provision method. Particularly, the present invention relates to an album provision system and an album provision method for an album on which a viewing protection film is applied.

2. Related Art

Conventionally, a number of images captured by a digital still camera while traveling are laid out in a predetermined template, displayed on a television monitor or printed on papers, so that the images are viewed in form of an album. Additionally, viewers are provided a number of captured images which are printed on a magazine or an album with the layout by such as a designer, as disclosed in Japanese Patent Application Publication No. 2004-221647.

However, when an album with an elaborate layout is created in the above disclosed invention, the user being the client of the album wants to previously check the finishing state of the album. The user can check the finishing state of the album on a monitor through a network such as Internet, but it is not necessarily that the album displayed on the monitor is colored as well as the actual album. Therefore, the user desires to check the finishing state by actually seeing the real album.

In this case, the album creator may provide a created album to the user without charging for creating the album in order to cause the user to check the finishing state. At this time, the user may copy the album without paying the fee. Meanwhile, in the case that the album creator charges for creating the album at this point, if the user requests to change the layout of the album, the album creator should charge the user again, so that the accounting system is complicated.

SUMMARY OF THE INVENTION

Thus, it is an object of the present invention to provide an album provision system and an album provision method which are capable of solving the problem accompanying the conventional art. The above and other subjects can be achieved by combining the features recited in independent claims. Then, dependent claims define further effective specific example of the present invention.

To solve the above-described problem, a first aspect of the present invention provides an album provision system. The album provision system includes: an image acquiring section for acquiring an image from a user; an album creating section for creating an album by laying out the image acquired by the image acquiring section; a film applying section for applying a viewing protection film to prevent the image from being viewed on the image laid out in the album created by the album creating section; a film presence determining section for determining whether the viewing protection film which has been applied by the film applying section is still applied on the image laid out in the album returned from the user when the album including the image on which the viewing protection film is applied is provided to the user and then the album is returned from the user; and a charging section for charging the user when the film presence determining section determines that the viewing protection film is not applied on the image.

The album provision system may further include a film propriety determining section for determining whether the viewing protection film applied on the image laid out in the album returned from the user is the viewing protection firm which is properly applied by the film applying section. The charging section may charge the user when the viewing protection film applied on the image laid out in an album returned from the user is not the viewing protection film which has been properly applied.

The album provision system may further include an image storage section for storing image data of the image laid out in the album. The film propriety determining section may include an image difference function storage section for storing an image difference function indicative of the difference between the appearance of the image viewed through the viewing protection film and the appearance of the image without through the viewing protection film, an image appearance calculating section for calculating the appearance of the image viewed through the viewing protection film from the image data stored in the image storage section using the image difference function stored in the image difference function storage section, an image capturing section for capturing the appearance of the image laid out in the album returned from the user through the viewing protection film and an image appearance comparison determining section for determining whether the viewing protection film applied on the image laid out in the album returned from the user is the viewing protection film which has been properly applied by the film applying section by comparing the appearance of the image calculated by the image appearance calculating section with the appearance of the image captured by the image capturing section. The image storage section may store the image data of the image laid out in the album along with the layout of the image in the album. The image appearance comparison determining section may compare the appearance of the image calculated by the image appearance calculating section with the appearance of the image which is laid out at the position stored in the image storage section and is captured by the image capturing section.

The viewing protection film applied on the image by the film applying section is a translucent film to blur the appearance of the image. The image difference function storage section may store the image difference function indicative of the amount of blurring of the image due to applying the translucent viewing protection film onto the image. The image appearance calculating section may calculate the appearance of the image blurred through the viewing protection film from the image data stored in the image storage section. The image appearance comparison determining section may determine whether the viewing protection film applied on the image laid out in the album returned from the user is the viewing protection film which has been properly applied by the film applying section by comparing the appearance of the blurred image calculated by the image appearance calculating section with the appearance of the image captured by the image capturing section.

The viewing protection film may be a film on which a pattern is drawn to superimpose the pattern on the appearance of the image. The image difference function storage section may store the image difference function indicative of the change of appearance of the image applying the viewing protection film on which the pattern is drawn. The image appearance calculating section may calculate the appearance of the image on which the pattern is superimposed through the viewing protection film from the image data stored in the image storage section. The image appearance comparison determining section may determine whether the viewing protection film applied on the image laid out in the album returned from the user is the viewing protection film which has been properly applied by the film applying section by comparing the appearance of the image on which the pattern calculated by the image appearance calculating section is superimposed with the appearance of the image captured by the image capturing section.

A second aspect of the present invention provides an album provision method. The album provision method includes the steps of: acquiring an image from a user; creating an album by laying out the image acquired in the image acquiring step; applying a viewing protection film to prevent the image being viewed on the image laid out in the album created in the album creating step; determining whether the viewing protection film which has been applied by the film applying step is still applied on the image laid out in the album returned from the user when the album including the image on which the viewing protection film is applied is provided to the user and then the album is returned from the user; charging the user when it is determined that the viewing protection film is not applied on the image in the film presence determining step.

Here, all necessary features of the present invention are not listed in the summary of the invention. The sub-combinations of the features may become the invention.

According to the present invention, when a created album is provided to the user in order to cause the user to check the finishing state of the created album, the album can be prevented from copying before charging for creating the album.

BRIEF DESCRIPTION OF THE DRAWINGS

FIG. 4 shows an image storage section 60;

FIG. 5 shows a film data storage section 40;

FIG. 6 shows a film applying position storage section 50;

FIG. 7 shows an image difference function storage section 710; and

DETAILED DESCRIPTION OF THE INVENTION

Hereinafter, the present invention will now be described through preferred embodiments. The embodiments do not limit the invention according to claims and all combinations of the features described in the embodiments are not necessarily essential to means for solving the problems of the invention.

Figure 1:
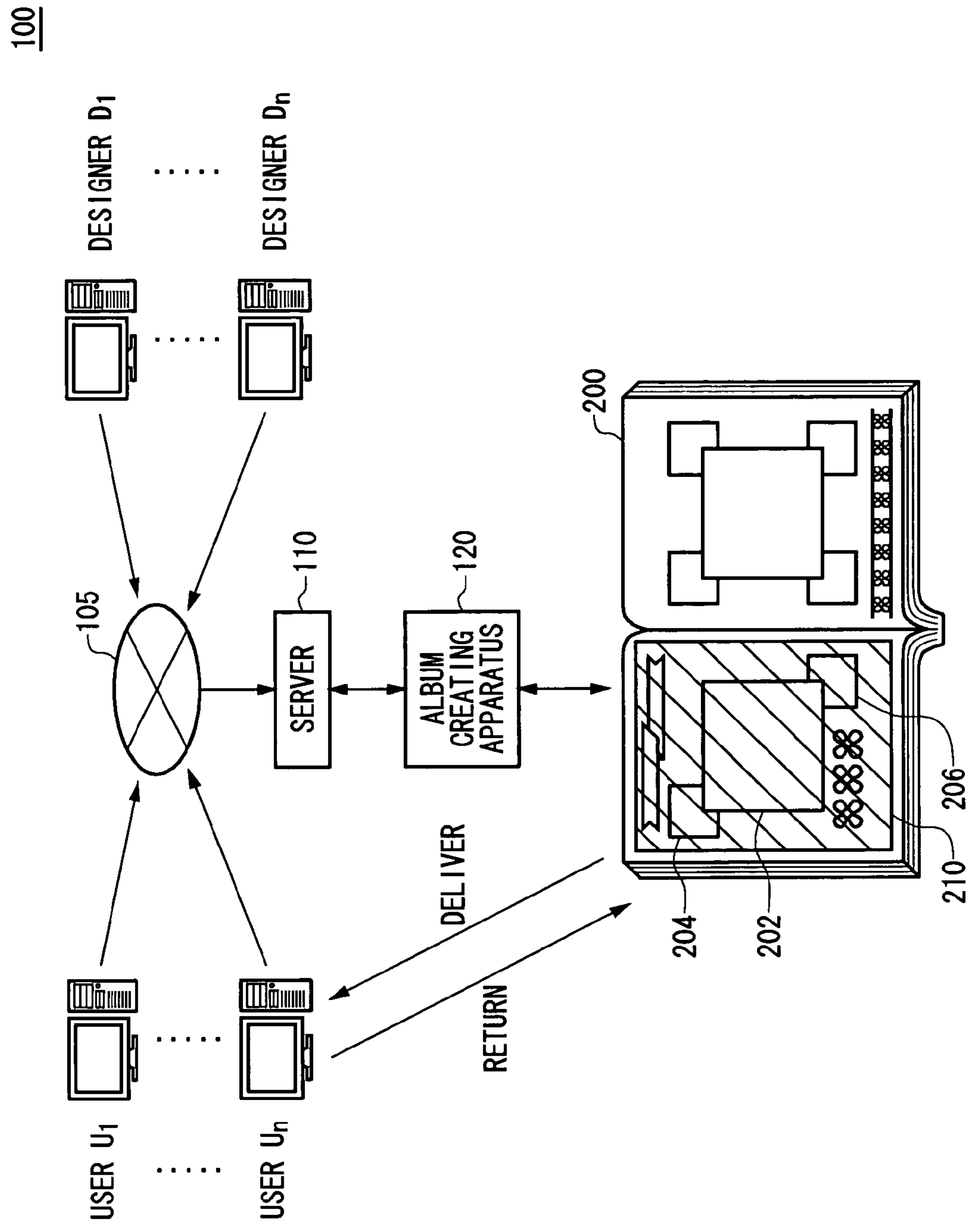
FIG. 1 is a conceptual diagram of an album provision system 100.

FIG. 1 is a conceptual diagram of an album provision system 100 according to an embodiment of the present invention. The album provision system 100 includes a server 110 and an album creating apparatus 120. The album provision system 100 according to the present embodiment aims to prevent an album from being copied before charging a user for creating the album when the created album is provided to the user in order to cause the user to check the finishing state of the album.

In the album provision system 100, the user provides a captured image data to the server 100 included in the album provision system 100 through a network 105 such as Internet. The server 100 may receive the image data from a memory, for example. Additionally, when the user provides the image data to the server 100, the user designates a designer who lays out the image data in an album. Then, the designer designated by the user designs the album suitable for the image data provided by the server 110 and provides a layout data for the album to the server 110. Then, the album creating apparatus 120 may receive the image data and the album layout data from the server 110 to create the album. Additionally, the album creating system 100 may receive the layout data of the album from the designer and store the same. Then, the album creating apparatus 120 may receive the image data and the layout data of the album and create the album. Further, the designer may create the page of the album using the image data provided to the server 110 by the user and provide the created page of the album to the server 110.

Then, the album creating apparatus 120 applies a viewing protection film 210 onto the created album 200. Fir example, the album creating apparatus 120 may apply the viewing protection film 210 onto the album 200 such that all of a captured image 202, a captured image 204 and a captured image 206 are coated by the film. Alternatively, it is not necessarily that all pages are coated with the viewing protection film 210, but a part of pages of the album 200 may be coated with the viewing protection film 210. Further, the viewing protection film 210 may be applied on a specified image or pattern. The captured image 202, the captured image 204 and the captured image 206 of the album on which the viewing protection film 210 is applied can not be viewed as clear images. Additionally, the viewing protection film 210 is applied on the captured image 202, the captured image 204 and the captured image 206 of the album, so that the captured image 202, the captured image 204 and the captured image 206 can be prevented from being clearly copied. Then, the viewing protection film 210 is applied on the image desired to view by the user, so that it can drive the user to purchase and view the album 200.

The viewing protection film 210 may be a film which is not applied again if it is removed from the image once. Therefore, if the user removes the viewing protection film 210 and views the image of the album, it can be surly known that the user has viewed the album. Further, the viewing protection film 210 may record an identifier for uniquely identifying the film or the date of return of the album 200. The album provision system 100 delivers the album 200 on which the viewing protection film 210 is applied to the user.

The user receives the delivered album 200, checks the pages applied on the viewing protection film 210 and the pages not applied on the viewing protection film 210 in the album 200 and determines whether the user will purchase the album 200. when the user will purchase the album 200, the user need not return the album 200. Then, the album provision system 100 charges the user after the date of return of the album 200 is passed. Meanwhile, the user does not purchase the album 200, the user returns the album 200 to the album provision system 100.

The album creating apparatus 120 determines whether the album 200 is returned after the date of return is passed, whether the viewing protection film 210 is applied, and if so, whether the viewing protection film 210 has been properly applied. Then, in the case of that the album 200 is returned after the date of return is passed, the viewing protection film is not applied and the viewing protection film has not properly applied, the album creating apparatus 120 provides information indicative of the above-described situation to the server 110. Then, the server 110 charges the user.

The album provision system according to the present embodiment applies the viewing protection film 210 on the image of the album, so that the image of the album can prevented from being clearly copied without removing the viewing protection film 210. Additionally, it can be determined whether the viewing protection film 210 has been properly applied on the image. Therefore, when the created album is provided to the user, the album can be prevented from being copied before charging for creating the album.

Figure 2:
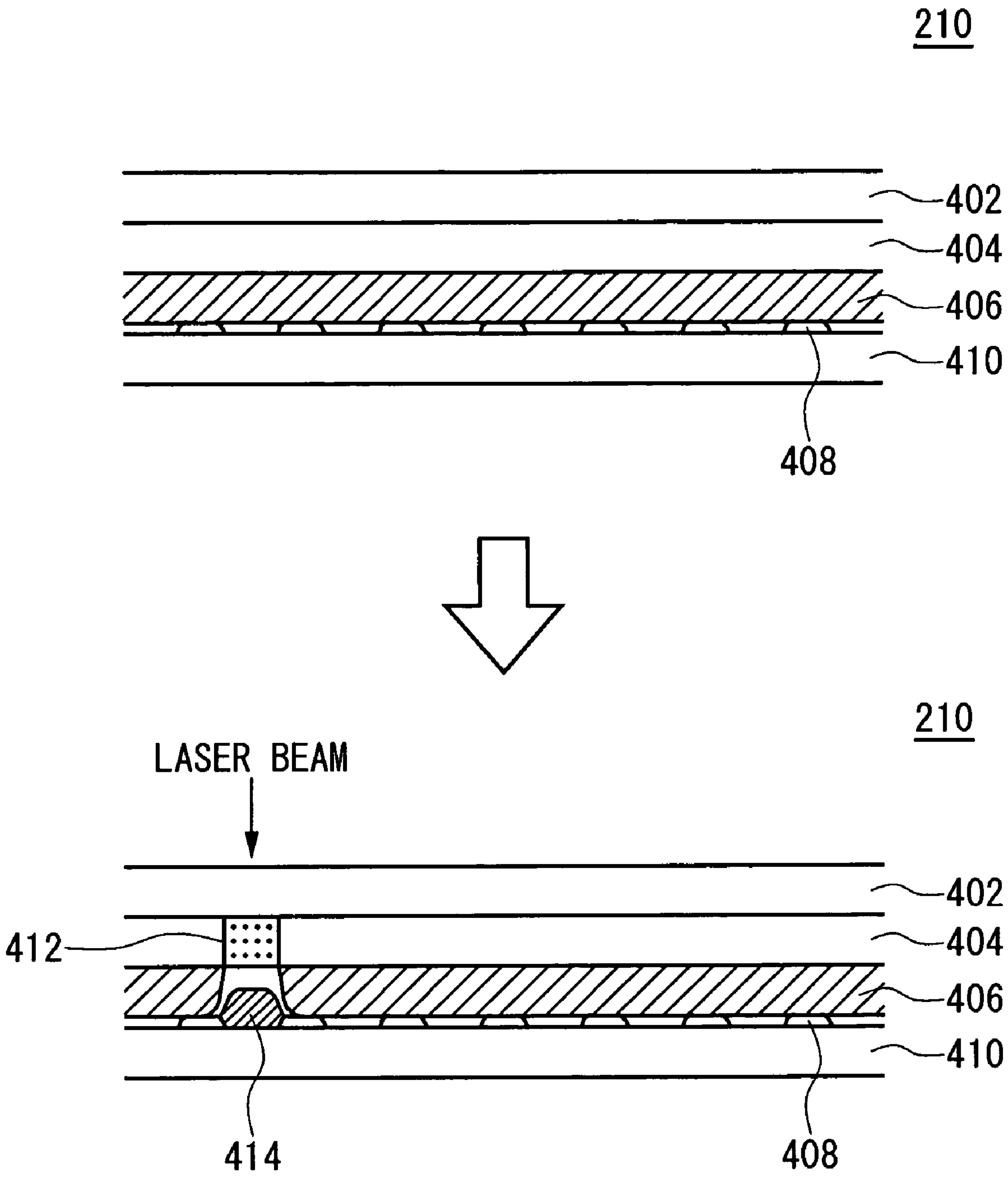
FIG. 2 shows the configuration of a viewing protection film 210.

FIG. 2 shows an example of the cross-sectional view of a viewing protection film 210 according to the present embodiment. The viewing protection film 210 includes a film 402, a foam layer 404 formed on the film 402 and a colored layer 406 formed on the foam layer 404. The viewing protection film 210 applied on a paper 410 on which an image 408 of the album is printed such that the surface on which the colored layer 406 is formed is attached to the album surface. The viewing protection film 210 does not easily permit to view the image, or prevents the image of the album from being viewed. The viewing protection film 210 may be a translucent film for blurring the appearance of the image of the album. Additionally, the viewing protection film 210 may have transparency enough to slightly view the image of the album. Additionally, it may be difficult to view the image of the album by drawing a pattern on the surface of the viewing protection film 210. Further, the viewing protection film 210 may be formed to make an effect to view the image of the album such that the image is filtered with such a lens shape, a sphere or a waveform.

Here, the film 402 may be a translucent film. Additionally, any pattern may be drawn on the one side of the film 402 faced to the foam layer 404 formed on the film 402. Further, the film 402 may be a polarizing film. For example, the film 402 may be formed using polyethylenenaphthalate (PET), polypropylene (PP), and polyester (PE). The transparency of the film 402 can be controlled by adjusting the crystallinity and the density of polymeric materials used to form the film 402. Additionally, the film 402 may be translucent by adding coloring agent thereto.

The foam layer 404 is formed with material which generates a gas by heating. For example, the gas can be generated by irradiating with a laser beam to locally heat the foam layer 404. Nitrogen-containing organic compound which generates nitrogen by heating may be used as the foam layer 404. Specifically, non-azide organic compound, nitroso compound, hydrazide compound and tetrazole compound may be used as the foam layer 404.

When the gas is emitted from the foam layer 404, a part of the colored layer 406 is attached to the paper 410 of the album by the pressure of the emitted gas. The colored layer 406 may be formed using UV cure ink and solid ink. Additionally, the colored layer 406 is formed as an artificial-adhesion layer, and the UV cure ink and the solid ink may be mixed therein. The colored layer 406 is formed as the artificial-adhesion layer, so that if the viewing protection film 210 is removed from the album once, the viewing protection film 210 can not be applied on the album again.

When the viewing protection film 210 is irradiated with a laser beam, a foam portion 412 of the foam layer 404 is heated and then, a gas is generated from the heated foam portion 412 of the foam layer 404. Then, a colored portion 414 of the colored layer 406 is adhered to the paper 410 of the album. Thereby an identifier to uniquely identify the image, an identifier to uniquely identify the viewing protection film 210 and the return date of the album can be printed on the viewing protection film 210 and the paper 410 of the album.

Figure 3:
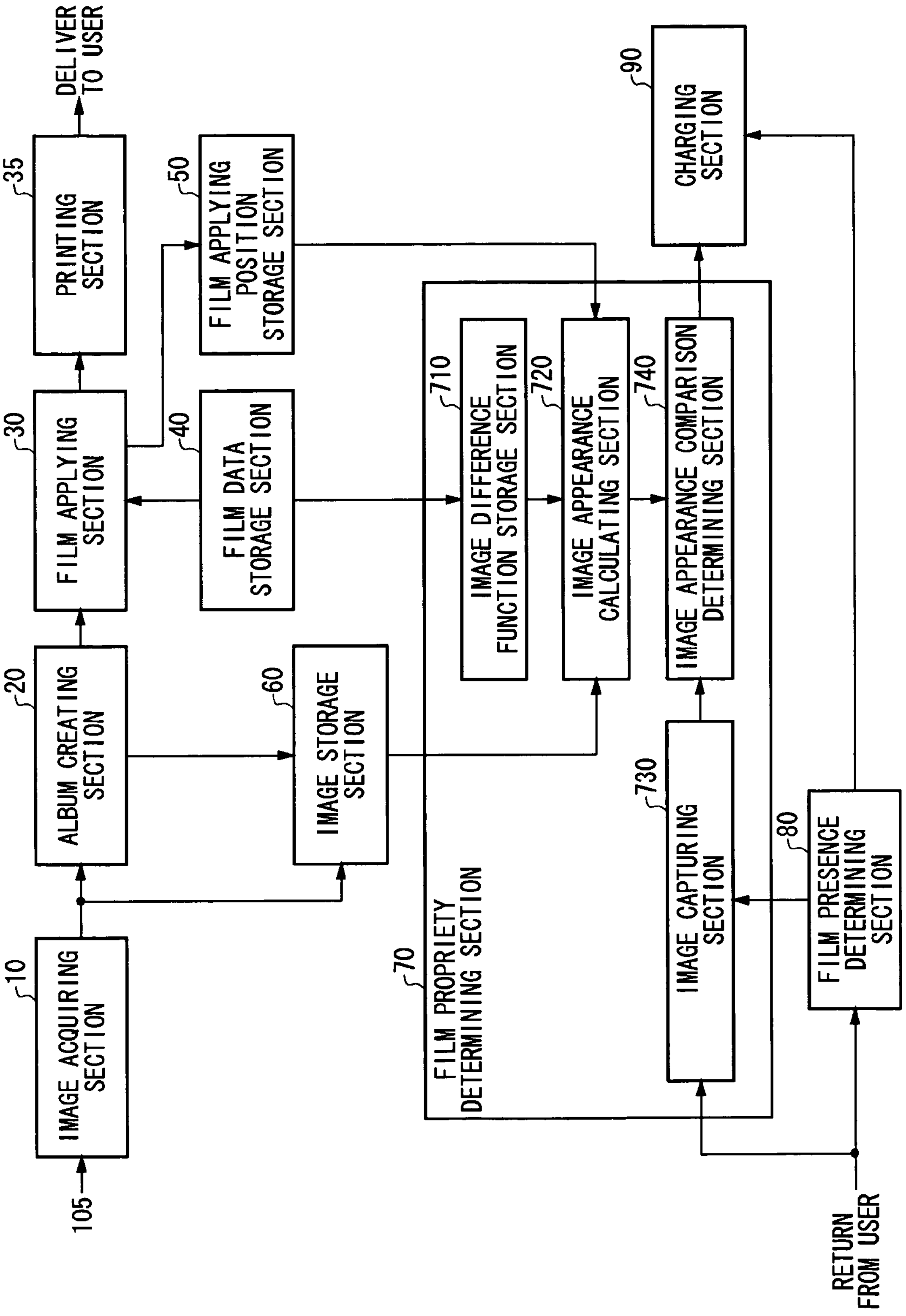
FIG. 3 is a block diagram showing the functional configuration of the album provision system 100.

FIG. 3 is a block diagram showing the functional configuration of the album provision system 100 according to the present embodiment. The album provision system 100 includes an image acquiring section 10, an album creating section 20, a film applying section 30, a printing section 35, a film data storage section 40, a film applying position storage section 50, an image storage section 60, a film propriety determining section 70, a film presence determining section 80 and a charging section 90. Additionally, the film propriety determining section 70 includes an image difference function storage section 710, an image appearance calculating section 720, an image capturing section 730 and an image appearance comparison determining section 740.

The image acquiring section 10 acquires an image captured by the user through a network 105 such as Internet or a memory using a semiconductor recording medium. Here, the image acquiring section 10 may give an image identifier to uniquely identify the image data to the captured image. Additionally, the image acquiring section 10 may acquire the layout of the album created by a designer. The image acquiring section 10 provides the acquired image and the acquired layout of the album to the album creating section 20 and the image storage section 60. The album creating section 20 creates the album using the received image and the layout of the album. The album creating section 20 provides the created album to the film applying section 30. Additionally, the album creating section 20 provides the image data of the image laid out in the album, the image identifier to uniquely identify the image data and the position of the image in the album to the image storage section 60.

The image storage section 60 stores the image data laid out in the album and the position of the image in the album received from the album creating section 20 in association with the image identifier to uniquely identify the image data. The image storage section 60 provides the image data and the position of the image in the album associated with the image identifier to the image appearance calculating section 720. The film data storage section 40 stores film data of the viewing protection film 210 in association with a film identifier to uniquely identify the viewing protection film 210 to be applied onto the album. The film data storage section 40 provides the film identifier associated with the viewing protection film 210 applied onto the album to the film applying section 30 and the image difference function storage section 710.

The film applying section 30 applies the viewing protection film 210 to prevent the image from being viewed onto the image laid out in the album received from the album creating section 20. Here, a film presence determination mark is drawn at a predetermined position of the viewing protection film 210. Additionally, the film applying section 30 receives the film identifier of the viewing protection film 210 applied onto the album from the film data storage section 40. The viewing protection film 210 may be applied over all the page of the album. Alternatively, the viewing protection film 210 may be applied over at least a part of the image laid out in the album and at least a part of the pattern in the page of the album. The album applying section 30 provides the album on which the viewing protection film 210 is applied, the image identifier of the image of the album and the film identifier associated with the applied viewing protection film 210 to the printing section 35. Additionally, the film applying section 30 provides information indicative of the position of the viewing protection film 210 applied onto the image in the album in association with the film identifier to the film applying position storage section 50 along with the image identifier of the image on which the viewing protection film is applied.

The film applying position storage section 50 stores the film identifier of the viewing protection film 210 applied onto the image of the album in association with the identifier to uniquely identify the image in the album, and a film applying position which is information indicative of the position at which the viewing protection film 210 is applied in the album. The film applying position storage section 50 provides the image identifier, the film identifier and the film applying position to the image appearance calculating section 720.

The printing section 35 prints the image identifier, the film identifier and the return date of the album at a predetermined position of the viewing protection film 210 which the is applied by the film applying section 30. For example, the viewing protection film 210 is irradiated with a laser beam to locally heat, so that the album can be printed as described above in FIG. 2. Additionally, since a part of colored layer 406 of the viewing protection film 210 is adhered on the album, the image identifier, the film identifier and the return date of the album may be read based on a part without the colored layer 406 after a part of colored layer 406 is adhered on the album. Here, the image identifier, the film identifier and the return date of the album may be printed using not only characters and symbols but also such as barcodes in the form of not being understood at a glance by humans. The album including the viewing protection film 210 on which the image identifier, the film identifier and the return date of the album are printed by the printing section 35 is delivered to the user.

When the album including the image on which the viewing protection film 210 is applied by the film applying section 30 is provided to the user, and then the album is returned from the user, the film presence determining section 80 determines whether the viewing protection film 210 which has been applied by the film applying section 30 is still applied on the image laid out in the album returned from the user. The presence or absence of the viewing protection film 210 is determined by reading the film presence determination mark drawn at a predetermined position on the viewing protection film 210. Then, the film presence determining section 80 reads the image identifier, the film identifier and the return date of the album which are printed on the viewing protection film 210. Next, the film presence determining section 80 determines whether the return date of the album has been passed based on the read return date of the album.

When the return date of the album has been passed, the film presence determining section 80 provides information indicative of that to the charging section 90. Meanwhile, when the return date of the album has not been passed, the film presence determining section 80 determines whether the viewing protection film 210 is applied on the image laid out in the album. When the viewing protection film 210 is applied on the album, the film presence determining section 80 provides information indicative of that to the image capturing section 730 included in the film propriety determining section 70. Alternatively, when the viewing protection film 210 is not applied on the album, the film presence determining section 80 provides information to the charging section 90.

When the image capturing section 730 receives from the film presence determining section 80 the information the viewing protection film 210 is applied on the album returned from the user, the image capturing section 730 captures the appearance of the image laid out in the album returned from the user through the viewing protection film 210 applied onto the album. Then, the image capturing section 730 provides data of the appearance of the captured image to the image appearance comparison determining section 740.

The image difference function storage section 710 stores the image difference function indicative of the difference between the appearance of image viewed through the viewing protection film 210 and the appearance of image viewed without through the viewing protection film 210. The image difference function storage section 710 provides the image difference function associated with the film identifier received from the film data storage section 40 to the image appearance calculating section 720.

The image appearance calculating section 720 calculates the appearance of the image viewed through the viewing protection film 210 from the image data received from the image storage section 60 using the image difference function received from the image difference function storage section 710. Specifically, the image appearance calculating section 720 receives from the image storage section 60 the image data and the position at which the image is laid out associated with the image identifier satisfying the condition that the image identifier provided from the film applying position storage section 50 is same as the image identifier read by the film presence determining section 80. Then, the image appearance calculating section 720 receives from the image difference function storage section 710 the film data and the image difference function of the viewing protection film 210 associated with the film identifier satisfying the condition that the film identifier received from the film applying position storage section 50 is same as the film identifier read by the film presence determining section 80. Additionally, the image appearance calculating section 720 receives also receives the position at which the viewing protection film 210 is applied in the album based on the film identifier read from the film applying position storage section by the film presence determining section 80.

Then, the image appearance calculating section 720 identifies the image data based on the image identifier received from the image storage section 60. Next, the image appearance calculating section 720 identifies the viewing protection film 210 applied onto the image corresponding to the image data based on the image layout received from the image storage section 60 and the film applying position received from the film applying storage section 50. Then, the image appearance calculating section 720 receives the image difference function corresponding to the viewing protection film 210 applied to the image based on the film identifier and calculates the appearance of the image which is looked difference through the viewing protection film 210.

For example, when the translucent viewing protection film 210 is applied onto the image, the image viewed through the viewing protection film 210 is blurred. In this case, the image appearance calculating section 720 performs an image processing to blur the image on the image data received from the image storage section 60 using the image difference function corresponding to the film identifier of the viewing protection film 210 applied onto the album received from the image difference function storage section 710. Thereby the appearance of the blurred image viewed through the viewing protection film 210 can be calculated from the image data received from the image data storage section 60 when the viewing protection film 210 is applied onto the image.

Additionally for example, a pattern is drawn on the viewing protection film 210 to superimpose the pattern on the appearance of the image. In this case, the image appearance calculating section 720 performs an image processing to superimpose the pattern on the image data received from the image storage section 60 using the image difference function corresponding to the film identifier of the viewing protection film 210 applied onto the album received from the image difference function storage section 710. Thereby when the viewing protection film 210 is applied onto the image, the appearance of the image on which the pattern is superimposed which is viewed through the viewing protection film 21 is calculated from the image data received from the image storage section 60. The image appearance calculating section 720 provides the calculated appearance of image to the image appearance comparison determining section 740.

The image appearance comparison determining section 740 compares the appearance of the image calculated by the image appearance calculating section 720 with the appearance of the image captured by the image capturing section 730 by matching. Then, the image appearance comparison determining section 740 determines whether the viewing protection film 210 applied onto the image laid out in the album retuned from the user is the viewing protection film 210 which has been properly applied by the film applying section 30. For example, when the image viewed through the viewing protection film 210 is blurred, the appearance of the blurred image calculated by the image calculating section 720 with the appearance of the image captured by the image capturing section 730 by matching. Then, when the appearance of the blurred image and the appearance of the captured image are matched by the matching, the image appearance determining section 740 determines that the viewing protection film 210 is properly applied. Alternatively, when the appearance of the blurred image and the appearance of the captured image are not matched by the matching, the image appearance determining section 740 determines that the viewing protection film 210 is not properly applied.

Additionally, when a pattern is drawn on the viewing protection film 210 applied onto the image by the film applying section 30 to superimpose the pattern on the appearance of the image, the image appearance comparison determining section 740 compares the appearance of the image on which the pattern is superimposed which is calculated by the image appearance calculating section 720 with the appearance of the image captured by the image capturing section 720 by matching. Then, when the appearance of the image on which the pattern is superimposed and the appearance of the captured image are matched by the matching, the image appearance comparison determining section 740 determines that the viewing protection film 210 is properly applied. Alternatively, when the appearance of the image on which the pattern is superimposed and the appearance of the captured image are not matched by the matching, the image appearance comparison determining section 740 determines that the viewing protection film 210 is not properly applied.

When the image appearance comparison determining section determines that the viewing protection film 210 is not properly applied, the image appearance comparison determining section 740 provides information indicative of the determination to the charging section 90. When the charging section 90 receives the information the viewing protection film 210 is nor applied on the image from the film presence determining section 80, the charging section 90 charges the user. Additionally, when the charging section 90 receives information the viewing protection film 210 applied on the image disposed in the album returned from the user is not properly applied from the image appearance comparison determining section 740 included in the film propriety determining section 70, the charging section 90 also charges the user.

Here, when the user is charged by the charging section 90, the user may pay for creating the album by means of a telephone company, a bank or a credit company. When the user pays by means of the telephone company, the charging section 90 charges the creation cost of the album as the telephone bill. The telephone bill is charged from the telephone company. When the user pays by means of the bank, the creation cost of the album is withdrawn from the user's account. Additionally, when the user pays by means of the credit company, the charging section 90 charges the credit company for the creation cost of the album. Then, the credit company charges the user in a prescribed manner. Thereby the user can pay the creation cost of the album without cash.

The album provision system 100 according to the present embodiment can prevent the image of the album from being clearly copied without removing the viewing protection film 210 because the viewing protection film 210 is applied on the image of the album. Additionally, the album provision system 100 according to the present embodiment can determine whether the viewing protection film 210 is properly applied. Thereby in the case that the created album is provided to the user and the creation cost of the album has not been charged yet, the album provision system can determine that the viewing protection film 210 is not properly applied and charge the user even if the viewing protection film 210 is removed and the album is copied, or the viewing protection film 210 is removed once and then applied again.

FIG. 4 shows an example of the image storage section 60. The image storage section 60 stores the image data, the layout and the size of the image disposed in the album in associated with the image identifier being capable of uniquely identifying the image data. The image layout in the album may be information indicative of the page of the album in which the image are laid out and coordinate information indicative of the position of the image in the page at the coordinate axis set to the album. The image storage section 60 receives the image data, the image layout and the image size from the album creating section 20 in associated with the image identifier from the album creating section 20 and stores the same. Then, the image storage section 60 provides the image data, the image layout in the album and the image size associated with the image identifier to the image appearance calculating section 720 included in the film propriety determining section 70.

FIG. 5 shows an example of the film data storage section 40. The film data storage section 40 stores film data in association with the film identifier being capable of uniquely identifying the film data. Here, the film data may be data such as a kind, property and size of the viewing protection film 210 applied on the album. The kind of viewing protection film 210 may be a kind indicative of films such as a translucent film, a polarizing film or a patterned film. Additionally, the property of the viewing protection film 210 may be physical property such as optical transmittance in the viewing protection film 210. When the a pattern is drawn on the viewing protection film 210, the film data storage section 40 may store information such as shape, color, lightness and luminance of the pattern.

FIG. 6 shows an example of the film applying position storage section 50. The film applying position storage section 50 stores the film identifier of the viewing protection film 210 applied on the image in the album and a film applying position being information indicative of the position at which the viewing protection film 210 is applied in the album in association with the identifier being capable of uniquely identifying the image in the album. The film applying position may be coordinate information indicative of the position at which the viewing protection film 210 is applied in a coordinate axis set to the album. The film applying position storage section 50 receives the film identifier of the viewing protection film 210 applied on the album in the film applying section 30 and positional information of the album on which the viewing protection film 210 is applied and stores the same. Then, the film applying position storage section 50 provides the image identifier, the film identifier and the film applying position at which the viewing protection film 210 is applied to the image appearance calculating section 720.

FIG. 7 shows an example of the image difference function storage section 710. The image difference function storage section 710 stores an image difference function indicative of the difference between the appearance viewed through the viewing protection film 210 and the appearance of the image viewed without through the image protection film 210. The image difference function may be a function indicative of the amount of blurring of the image due to applying the translucent viewing protection film 210 onto the image, and the change of appearance of the image by applying the translucent viewing protection film 210 on the image when the pattern is drawn on the viewing protection film 210.

Additionally, the image difference function may be difference functions depending on the kinds of viewing protection film 210. For example, the image difference function may be a function based on the amount of change of the appearance of the image changed by the material, the transparency, the optical reflectance of the viewing protection film 210 and the pattern drawn on the viewing protection film 210 when the appearance of the image is viewed through the viewing protection film 210. For example, when the pattern is drawn on the viewing protection film 210, information on the color of the pattern may be the image difference function. When the viewing protection film 210 is applied on the image in the album based on the information on the color, the image appearance calculating section 720 can calculate the color of the appearance of the image viewed through the viewing protection film 210 as a mixed color of the color of pattern and the color of image of the album.

By means of the image difference function, the image appearance calculating section 720 can calculate image data indicative of the appearance of image on which the viewing protection film 210 is applied from the image data and the data of the kind of film without actually applying the viewing protection.

Figure 8:
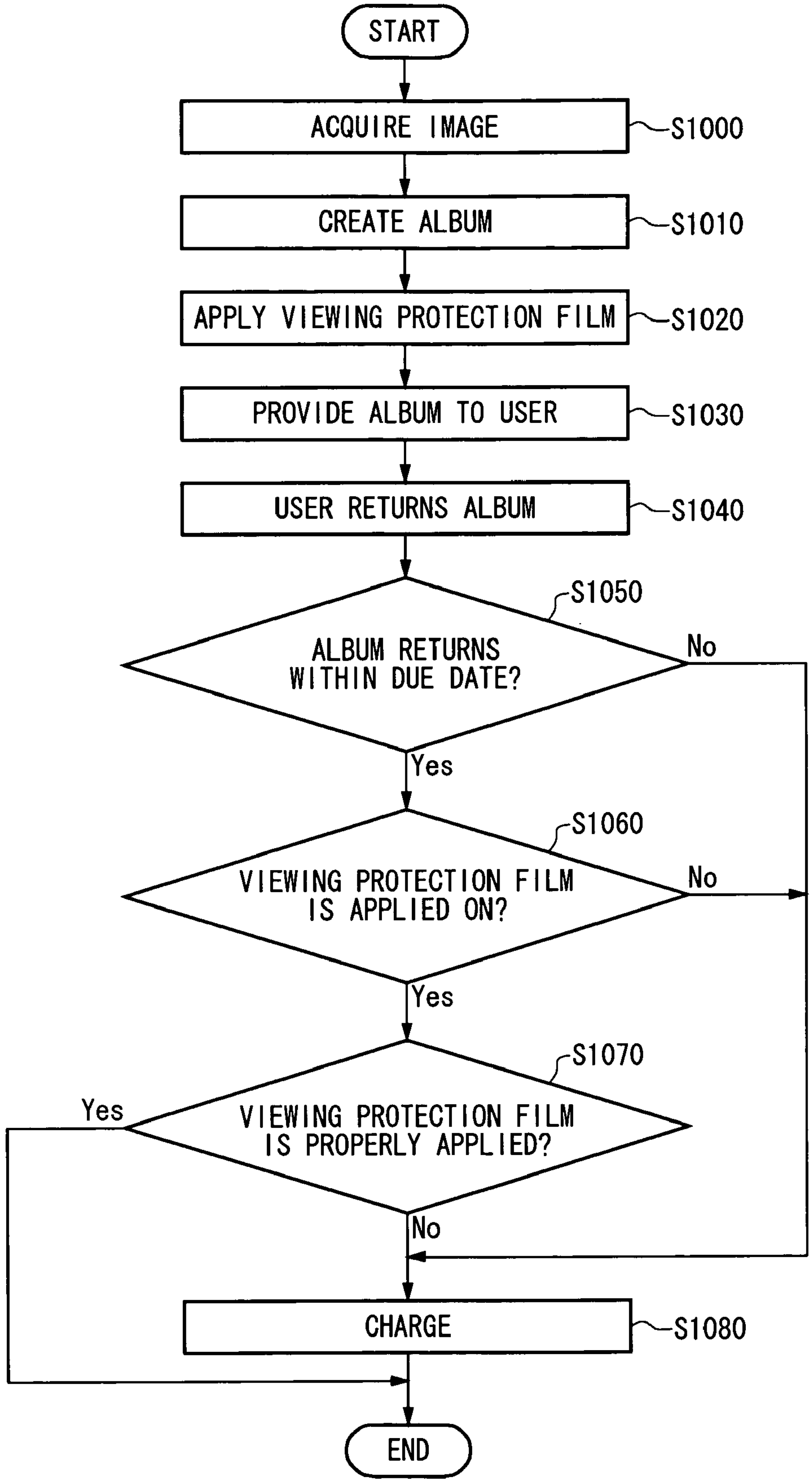
FIG. 8 is a flowchart showing the processing of the album provision system 100.

FIG. 8 is an example of a flowchart showing the processing of the album provision system 100. Firstly, the image acquiring section 10 acquires an image from the user (S1000). The image acquiring section 10 provides the acquired image to the image creating section 20. The album creating section 20 creates the album using the image received from the image acquiring section 10 (S1010). Next, the album creating section 20 provides the created album to the album applying section 30. The film applying section 30 applies the viewing protection film 210 onto the received album (S1020). After the viewing protection film 210 is applied by the film applying section 30, the image identifier, the film identifier and the return date of the album are printed on the viewing protection film 210 by the printing section 35. Then, the album is provided to the user (S1030).

When the user returns the album (S1040), the film presence determining section 80 determines whether the album is returned within due date (S1050). Here, when the user desires to purchase the provided album, the user need not return the album but may hold the same. In this case, the album provision system 100 charges the user after passing the return date of the album.

When the film presence determining section 80 determines that the album is not returned within due date (S1050: No), the information indicating that the return date of the album has been passed is provided to the charging section 90. Then, the charging section 90 charges the user for creating the album (S1080). Alternatively, the film presence determining section 80 determines that the album is returned within due date (S1050: Yes), the film presence determining section 80 subsequently determines whether the viewing protection film 210 is applied on the album (S1060).

When the film presence determining section 80 determines that the viewing protection film 210 is not applied on the album (S1060: No), information the viewing protection film 210 is not applied on the album to the charging section 90. Then, the charging section 90 charges the user for creating the album (S1080). Alternatively, the film presence determining section 80 determines that the viewing protection film 210 is applied on the album (S1060: Yes), information is provided to the image capturing section 730.

The image capturing section 730 captures the appearance of the image laid out in the album returned from the user through the viewing protection film 210. Then, the captured image is provided to the image appearance comparison determining section 740. The image appearance calculating section 720 calculates the appearance of the image viewed through the viewing protection film 210 based on the image received from the user, the image difference function corresponding to the viewing protection film 210 applied on the album and the position in the image at which the viewing protection film 210 is applied. Then, the image appearance calculating section 720 provides the calculated image to the image appearance comparison determining section 740.

Next, the image appearance calculating section 720 determines whether the viewing protection film 210 applied on the album is the viewing protection film 210 properly applied by matching the appearance of the image received from the image capturing section 730 with the appearance of the image calculated by the image appearance calculating section 720. Then, the viewing protection film 210 is not properly applied (S1070: No), information indicative of that is provided from the image appearance comparison determining section 740 to the charging section 90. Then, the charging section 90 charges the user for creating the album (S1080). Alternatively, the viewing protection film 210 is properly applied (S1070: Yes), the album provision system ends the processing.

While the present invention have been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

What is claimed is:

1. An album provision system comprising:

an image acquiring section for acquiring an image from a user;

an album creating section for laying out the image acquired by the image acquiring section to create an album;

a film applying section for applying a viewing protection film to prevent the image from being viewed on the image laid out in the album created by the image creating section;

a film presence determining section for determining whether the viewing protection film applied by the film applying section is still applied on the image laid out in the album returned from the user when the album including the image on which the viewing protection film is applied on the image by the film applying section is provided to the user and then returned from the user; and a charging section for charging the user when the film presence determining section determines that the viewing protection film is not applied on the image;

further comprising a film propriety determining section for determining whether the viewing protection film applied on the image laid out in the album returned from the user is the viewing protection film which has been properly applied by the film applying section when the film presence determining section determines that the viewing protection film is applied on the image, wherein the charging section charges the user when the film propriety determining section determines that the viewing protection film applied on the image is not properly applied;

an image storage section for storing image data of the image laid out in the album, wherein the film propriety determining section including:

an image difference function storage section for storing an image difference function indicative of the difference between the appearance of the image viewed through the viewing protection film and the appearance of the image viewed without through the viewing protection film;

an image appearance calculating section for calculating the appearance of the image viewed through the viewing protection film from the image data stored in the image storage section using the image difference function stored in the image difference function storage section;

an image capturing section for capturing the appearance of the image laid out in the album returned from the user through the viewing protection film; and an image appearance comparison determining section for determining whether the viewing protection film applied on the image laid out in the album returned from the user is the viewing protection film properly applied by the film applying section by comparing the appearance of the image calculated by the image appearance calculating section with the appearance of the image captured by the image capturing section.

2. The album provision system according to claim 1, wherein the image storage section stores the image data of the image laid out in the album along with the layout of the image in the album, and the image appearance comparison determining section compares the appearance of the image calculated by the image appearance calculating section with the appearance of the image laid out at the position stored in the image storage section, which is captured by the image capturing section.

3. The album provision system according to claim 1, wherein the viewing protection film applied on the image by the film applying section is a translucent film to blur the appearance of the image, the image difference function storage section stores an image difference function indicative of the amount of blurring of the image due to applying the translucent viewing protection film onto the image, the image appearance calculating section calculates the appearance of the image blurred through the viewing protection film from the image data stored in the image storage section, and the image appearance comparison determining section determines whether the viewing protection film applied on the image laid out in the album returned from the user is the viewing protection film which has been properly applied by the film applying section by comparing the appearance of the blurred image calculated by the image appearance calculating section with the appearance of the image captured by the image capturing section.

4. The album provision system according to claim 1, wherein the viewing protection film applied onto the image by the film applying section is a film on which a pattern to superimpose the pattern on the appearance of the image is drawn, the image difference function storage section stores an image difference function indicative of the change of appearance of the image due to applying the viewing protection film on which the pattern is drawn onto the image, the image appearance calculating section calculates the appearance of the image on which the pattern is superimposed through the viewing protection film from the image data stored in the image storage section, and the image appearance comparison determining section determines whether the viewing protection film applied on the image laid out in the album returned from the user is the viewing protection film which has been properly applied by the film applying section by comparing the appearance of the image on which the pattern calculated by the image appearance calculating section is superimposed with the appearance of the image captured by the image capturing section.

5. An album provision method comprising:

acquiring an image from a user;

creating an album by laying out the image acquired in the image acquiring step;

applying a viewing protection film to prevent the image from being viewed on the image laid out in the album created in the album creating step;

determining whether the viewing protection film applied in the film applying step is still applied on the image laid out in the album returned from the user when the album including the image on which the viewing protection film is applied on the image in the film applying step is provided to the user and then returned from the user; and determining film propriety by determining whether the viewing protection film applied has been removed once when the film presence determination determines that the viewing protection film is still applied on the image laid out in the album returned from the user; and charging the user when it is determined that the viewing protection film is not applied on the image and when the film propriety determination determines that the viewing protection film applied by the film applying section has been removed once in the film presence determining step, wherein the film propriety determination determines whether the viewing protection film applied on the image laid out in the album returned from the user is the viewing protection film which has been properly applied by the film applying step when the film presence determination determines that the viewing protection film is applied on the image, wherein charging the user is performed when the film propriety determination determines that the viewing protection film applied on the image is not properly applied; and further comprising storing image data of the image laid out in the album, wherein the film propriety determination includes:

storing an image difference function indicative of the difference between the appearance of the image viewed through the viewing protection film and the appearance of the image viewed without the viewing protection film;

calculating an image appearance of the image viewed through the viewing protection film from the image data using the image difference function stored;

capturing an appearance of the image laid out in the album returned from the user through the viewing protection film; and comparing images for determining whether the viewing protection film applied on the image laid out in the album returned from the user is the viewing protection film properly applied by the film applying section by comparing the appearance of the image calculated by the image appearance calculation with the appearance of the image captured.

6. The album provision method according to claim 5, further comprising storing the image data of the image laid out in the album along with the layout of the image in the album, and wherein comparing the appearance of the image comprises comparing the appearance of the image calculated by the image appearance calculation with the appearance of the image laid out at the position stored in the image storage, which is captured by the image capturing.

7. The album provision method according to claim 5, wherein the viewing protection film applied on the image is a translucent film to blur the appearance of the image, the image difference function storage stores an image difference function indicative of the amount of blurring of the image due to applying the translucent viewing protection film onto the image, the image appearance calculation calculates the appearance of the image blurred through the viewing protection film from the image data stored in the image storage, and the image appearance comparison determination determines whether the viewing protection film applied on the image laid out in the album returned from the user is the viewing protection film which has been properly applied by comparing the appearance of the blurred image with the appearance of the image captured by the image capturing.

8. The album provision method according to claim 5, wherein the viewing protection film applied onto the image by the film applying section is a film on which a pattern to superimpose the pattern on the appearance of the image is drawn, the image difference function storage stores an image difference function indicative of the change of appearance of the image due to applying the viewing protection film on which the pattern is drawn onto the image, the image appearance calculation calculates the appearance of the image on which the pattern is superimposed through the viewing protection film from the image data stored in the image storage, and the image appearance comparison determination determines whether the viewing protection film applied on the image laid out in the album returned from the user is the viewing protection film which has been properly applied by comparing the appearance of the image on which the pattern calculated by the image appearance calculation is superimposed with the appearance of the image captured by the image capturing.

* * * * *